United States Patent Office 2,971,961
Patented Feb. 14, 1961

2,971,961

SPIRO(CYCLOALKYLPYRROLIDYL)-α,α-DIPHENYL ALKANOAMIDES

Robert B. Moffett, Kalamazoo, Mich., assignor to The Upjohn Company, Kalamazoo, Mich., a corporation of Michigan No Drawing. Filed Mar. 22, 1956, Ser. No. 573,082

15 Claims. (Cl. 260—313)

This invention relates to novel α,α-diaryl-ω-pyrrolidylalkyl compounds and to novel processes for their production. This application is a continuation-in-part of application Serial No. 522,847, filed July 18, 1955, Now U.S. Patent No. 2,911,409.

The invention has among its objects the provision of novel α,α-diaryl-ω-pyrrolidylalkyl compounds, particularly α,α-diaryl-ω-2-substituted-pyrrolidylalkyl compounds of the following formula which can exist in the form of the free bases or coordination complexes thereof such as the amine oxides or the quaternary ammonium compounds; or as addition complexes thereof such as the acid addition salts or the amine oxide acid addition salts:

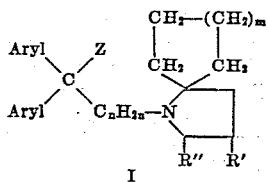

I in which each Aryl is an aryl group, $m$ is a whole number from one to two, inclusive, $n$ is a whole number from two to six, inclusive, —$C_nH_{2n}$— is an alkylene group which may be straight chain or branched and which has at least two carbon atoms between the valences, R' and R" are hydrogen or methyl, and Z is a radical selected from the cyano radical (—CN) and a substituted or unsubstituted carbamoyl radical (—CONR'''R'''') wherein R''' and R'''' when taken singly are hydrogen or the same or different lower-alkyl groups containing from one to eight carbon atoms, inclusive, and when taken collectively are an alkylene radical or an oxaalkylene radical joined to the nitrogen atom to form a cyclic aliphatic amino group.

The preparation of compounds of Formula I can conveniently be accomplished by a condensation reaction between 2-spiro-pyrrolidylalkyl halides and an α,α-disubstituted compound of the following formula:

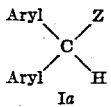

Ia in which each Aryl is an aryl group such as phenyl, p-biphenylyl, tolyl, xylyl, and the like, either of which can be further substituted by indifferent substituents such as chlorine, bromine, iodine, nitro, hydroxy, lower-alkoxy, lower tertiaryamino, and the like, and Z has the value given hereinbefore.

The alkylene group —$C_nH_{2n}$—, of Formula I, can be a straight chain (polymethylene) or a branched chain alkylene group containing from two to six carbon atoms, inclusive, such as ethylene, propylene, butylene, amylene, and hexylene including the isomeric forms thereof. Examples of lower-alkyl groups (R''' and R'''') are methyl, ethyl, propyl, butyl, hexyl, octyl, and the like, including isomeric forms thereof.

The term "lower-alkyl" in this specification and claims is used to designate alkyl groups having not more than eight carbon atoms.

The α,α-disubstituted compounds (Formula Ia) used in the condensation reaction previously referred to are known in the art, and the condensation reaction between such disubstituted compounds and the 2-spiro-pyrrolidylalkyl halides can be carried out according to methods disclosed in the prior art for making chemical compounds having pharmaceutical and pharmacological activity, for example, Bockmühl et al., German Patent 731,561; Bockmühl et al., Ann., 561, 52 (1948); Cheney et al., J. Org. Chem., 17, 771 (1952); Wheatley et al., J. Org. Chem., 19, 794 (1954); Speeter, U.S. Patent 2,647,926 and German patent application 12,358 12q 6/02 opened for inspection December 17, 1952. Further examples of such condensations are disclosed in application S.N. 516,764, filed June 20, 1955, by Aspergren, Moffett and Speeter.

In the instance where Z of Formula Ia is a cyano (—CN) group, the α,α-disubstituted condensation reactant can if desired be transformed prior to condensation into the corresponding carboxylic acid, carboxylic acid halide, or carboxylic acid amide, either N-unsubstituted, N-monosubstituted or N,N-disubstituted. The N-unsubstituted amide of Formula Ia is conveniently made by hydrolysis of the nitrile whereas the N-mono- and N,N-disubstituted amides may be made by amination of the carboxylic acid halide or, alternatively, by alkylation of the N-unsubstituted amide. Type reactions for these transformations are disclosed is the Aspergren et al. application previously mentioned.

The 2-spiro-pyrrolidylalkyl halides can be conveniently prepared by the following sequence of reactions as disclosed in copending application S.N. 522,847, filed July 18, 1955, now U.S. Patent No. 2,911,409:

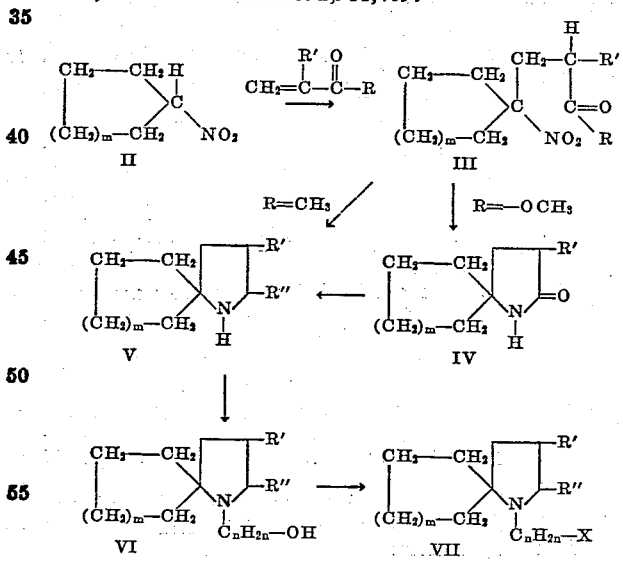

wherein $m$, $n$, —$C_nH_{2n}$—, R' and R" have the values heretofore given. R is lower-alkoxy, preferably methoxy or ethoxy, or methyl, and X is a halogen such as chlorine, bromine or iodine.

The preparation of the starting materials for the compounds of the present invention involves the conversion of a nitrocycloalkane (II) to a spiro-substituted-pyrrolidine (V). In carrying out the first step of this conversion, a nitrocycloalkane (II) is condensed with an olefinic compound, preferably an alkyl acrylate, represented by the following formula:

wherein R and R' have the values given hereinbefore and especially wherein R is lower-alkoxy, preferably methoxy or ethoxy, and R' is hydrogen, to produce a 1-(β-carbonylethyl)-nitrocycloalkane represented by Formula III. The reaction conditions described by Moffett and White, J. Org. Chem., 17, 407 (1952), can be employed using a condensing catalyst, preferably benzyltrimethyl-ammonium hydroxide, sodium hydroxide, potassium hydroxide, or other strong base. Other bases, e.g., piperidine, pyrrolidine, morpholine, can also be used. The resulting product (III) can then be isolated and purified, e.g., in the manner described hereinafter, or the reaction mixture freed of solvent and used without isolation in the subsequent reduction reaction.

In the reduction step, a compound represented by Formula III is reductively cyclized to produce a spiropyrrolidine (V) when R is methyl or a spiropyrrolidone (IV) when R is lower-alkoxy. In the former case, the cyclization is accomplished with hydrogen and a hydrogenation catalyst, e.g., Raney nickel, etc. In the latter case, the hydrogenation is accomplished by hydrogenation with a suitable catalyst, e.g., in the manner described by Moffett and White (loc. cit.) and as described hereinafter, or by chemical means, e.g., zinc or iron in the presence of acid.

The conversion of a spiropyrrolidone (IV) to a spiropyrrolidine (V) can be accomplished with lithium aluminum hydride, or other chemical reducing agent capable of reducing a pyrrolidone to a pyrrolidine, or by high pressure hydrogenation according to techniques known in the art.

The alkylation of a spiropyrrolidine (V) to an N-ω- hydroxyalkyl-spiropyrrolidine (VI) can be accomplished by heating a spiropyrrolidine (V) with a halohydrin, e.g., ethylene chlorohydrin, ethylene bromohydrin, propylene chlorohydrin, trimethylene chlorohydrin, etc., an alkylene oxide, e.g., ethylene oxide, propylene oxide, in the presence or absence of a solvent, or a halo ester followed by reduction of the thus-produced pyrrolidyl alkanoic acid ester with lithium aluminum hydride, e.g., according to methods known in the art [Moffett, J. Org. Chem., 14, 862 (1949), and previous papers referred to therein], to produce a 2-spiro-substituted-pyrrolidyl-alkanol (VI). Examples of these alkanols include those represented by Formula VI wherein the pyrrolidyl substituted alkanol group is ethanol, propanol, 1-methyl-ethanol, 1-methylpropanol, 2-methylpropanol, 1,2-dimethylpropanol, 1,3-dimethylpropanol, 2,3-dimethylpropanol, 1,2,3-trimethylpropanol, butanol, pentanol, hexanol, 2,3-dimethylbutanol, 1-methylpentanol, etc. group.

These pyrrolidylalkanols (VI) can then be reacted with thionyl bromide, thionyl chloride, phosphorous tribromide, phosphorous trichloride, etc., to produce acid addition salts of pyrrolidyl-alkyl halides (VII), e.g., wherein the alkyl group is that of an alkanol named above and the hydroxy group has been replaced by a chlorine or bromine atom, e.g., in the manner described hereinafter and by Moffett et al., J. Am. Chem. Soc., 77, 1565 (1955).

As seen from Formula I, the compounds of this invention include novel α,α-diaryl-ω-pyrrolidylalkanoamides of the following formula:

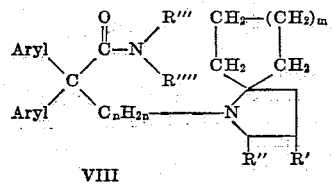

VIII in which Aryl, m, n, —$C_nH_{2n}$—, R', R'', R''', R'''' have the values stated hereinbefore.

The alkanoamides represented by Formula VIII possess anti-spasmodic, anti-secretory and/or diuretic activity particularly in the form of their salts such as the hydrochloride or the hydrobromide, or in the form of their quaternary compounds such as the methobromide or the ethobromide. They are characterized as active uterine stimulants of unusually long duration at moderate dosages.

Referring particularly to the compounds represented by Formula VIII, the aryl groups can be phenyl, p-chlorophenyl, p-biphenylyl, tolyl, xylyl, p-aminophenyl, propoxyphenyl, o-chlorophenyl, and the like. The radicals R''' and R'''' can each be hydrogen, methyl, ethyl, propyl, butyl, isobutyl, pentyl, hexyl, isohexyl, and the like. R''' and R'''' can also be joined to make, with the amido nitrogen atom, cyclic aliphatic amino groups such as morpholinyl, 2 - methylmorpholinyl, piperidyl, 4 - methylpiperidyl, pyrrolidinyl, 2,2-dimethylpyrrolidinyl, and the like.

Condensation reaction between the compounds of Formula VII and the α,α-diaryl-substituted compounds of Formula Ia is effected in a manner to be described hereinafter. Where the radical Z of Formula I is the cyano group, i.e., the α,α-diaryl-ω-pyrrolidylalkyl compounds of Formula I, prepared by reacting the compounds of Formula VII with α,α-diaryl-acetonitriles, hydrolysis with a hydrolyzing agent such as hydrated concentrated sulfuric acid produces α,α-diaryl-ω-pyrrolidylalkanoamides in which the amido nitrogen is unsubstituted, i.e., amides of Formula VIII in which R''' and R'''' are hydrogen atoms. These latter compounds can be alkylated in accordance with conventional amide alkylating procedures to produce the alkyl-substituted amides, i.e., those wherein at least one of R''' and R'''' is an alkyl group.

Where an N-monoalkyl amide is desired, a primary amido compound of Formula VIII, i.e., an N-unsubstituted amide, is alkylated at the amido nitrogen atom, as noted above. Where a disubstituted amide is desired, i.e., where R''' and R'''' taken singly are alkyl groups or taken collectively are an alkylene or oxa-alkylene radical, it is preferred first to provide the disubstituted amido group in an α,α-diaryl compound of Formula Ia prior to condensation with the 2-spiro-pyrrolidylalkyl halides of Formula VII.

Alkylation of the amido nitrogen atom of N-unsubstituted amides of Formula VIII can be accomplished by use of an alkyl halide according to the methods described in the aforesaid application of Aspergren et al.

Condensation of an α,α-diaryl-N,N-disubstituted-acetamide (Formula Ia) with a 2-spiro-pyrrolidylalkyl halide of Formula VII will be disclosed hereinafter.

The compounds of the present invention wherein Z of Formula I is an amido group, either unsubstituted, monosubstituted, or disubstituted, are usually administered orally, preferably as an acid addition salt, e.g., hydrochloride, hydrobromide, hydriodide, sulfate, citrate, acetate, succinate, nitrate, or as a quaternary ammonium salt, e.g., methobromide, methiodide, ethochloride, or as an amine oxide (prepared by oxidation of these compounds with a peracid or hydrogen peroxide) or acid addition salt thereof, etc. in the form of tablets, stable aqueous solutions, elixirs, etc.

The condensation reaction between the α,α-disubstituted compounds of Formula Ia and the 2-spiro-pyrrolidylalkyl halides of Formula VII is carried out in accordance with the methods disclosed in the Cheney et al. and in the German patent references previously referred to. The two reactants are condensed in the presence of an alkali-metal amide, e.g., sodium amide or lithium amide in an inert reaction medium. Suitable α,α-disubstituted compounds include diphenylacetopiperidide, diphenylacetonitrile, ditolylacetonitrile, α,α-diphenyl-N,N-dimethyl - acetamide, (p - chlorophenyl) - phenylacetonitrile, and the like.

The condensation is advantageously carried out in an inert solvent or diluent such as benzene, toluene, xylene, aliphatic hydrocarbon solvent, halogenated hydrocarbon solvent, di-lower-alkyl ethers and the like. The temperature is preferably that of reflux, but can range up to about 150 degrees centigrade. In place of the alkali-metal amide, other alkaline condensing agents such as an alkali-metal hydride, alkali-metal alkoxide or alkali metal can be used, e.g., sodium hydride, lithium hydride, potassium hydroxide, sodium, and the like.

Substitution of the amido nitrogen with R''' and R'''' can be carried out either before or after the condensation reaction as previously stated. In the former case, it can be carried out in accordance with prior known methods for alkylating or otherwise substituting primary amides. In the latter case it can be carried out as a condensation between the α,α-disubstituted compounds of Formula Ia and the 2-spiro-pyrrolidylalkyl halides, i.e., by using an alkali-metal compound noted above as condensing agent.

The following preparations and examples are illustrative of the process and products of the present invention, but are not to be construed as limiting.

PREPARATION 1

Methyl β-(1-nitrocyclohexyl)-propionate

In a one-liter, 3-necked flask fitted with stirrer, dropping funnel and thermometer were placed 333 grams (2.55 moles) of nitrocyclohexane (technical grade, redistilled), 300 milliliters of dioxane (lithium aluminum hydride-treated and redistilled) and thirty milliliters of a 35 percent methanolic solution of benzyltrimethyl-ammonium hydroxide. To the resulting stirred mixture was added 227.5 grams (2.55 moles) of methyl acrylate (redistilled) over a period of fifteen minutes, during which time the temperature rose to about 100 degrees centigrade. When the temperature had dropped to about 55 degrees centigrade, the mixture was heated on a steam bath with stirring for three hours and then maintained at room temperature for about eighteen hours. The mixture was then diluted with about one liter of ether, acidified with dilute hydrochloric acid, extracted twice with a saturated aqueous sodium chloride solution, then with an aqueous sodium chloride solution containing a little sodium bicarbonate and finally with saturated aqueous sodium chloride solution. The organic layer was separated, dried and distilled through a Vigreux column. There was thus obtained 523.3 grams, a yield of 96.8 percent of the theoretical, of methyl β-(1-nitrocyclohexyl)-propionate distilling at between 96.5 degrees centigrade at a pressure of 0.05 millimeter of mercury absolute to 124.5 degrees centigrade at a pressure of 0.35 millimeter and having an $n_D^{25}$ of 1.4710. A sample was redistilled through a six-inch, helice-packed column to give a fraction boiling at 96 degrees centigrade at 0.025 millimeter pressure and having the analysis below.

Calculated for $C_{10}H_{17}NO_4$: C, 55.80; H, 7.96; N, 6.51. Found: C, 56.05; H, 8.02; N, 6.48.

PREPARATION 2

Spiro[cyclohexane-1,2'-pyrrolidone-5']

A solution of 453.3 grams (2.11 moles) of methyl β-(nitrocyclohexyl)-propionate in 1.26 liters of methanol-denatured ethanol was hydrogenated in the presence of Raney nickel catalyst for eighteen hours at fifty degrees centigrade. The mixture was cooled, filtered and the filtrate distilled to dryness at reduced pressure. The white crystalline residue was dissolved in two liters of boiling methylcyclohexane which was then distilled until about 100 milliliters had been collected, to remove any residual ethanol. The solution was clarified by pressure filtration while hot and then cooled. There was thus obtained 253 grams, a yield of 72 percent of the theoretical, of spiro[cyclohexane-1,2'-pyrrolidone-5'] melting at 131 to 133 degrees centigrade. A further 31.4 grams of product melting at 129 to 132 degrees centigrade was obtained by concentration of the mother liquor. A sample recrystallized from Skellysolve B (hexane hydrocarbons) melted at 132 to 133 degrees centigrade and had the analysis below.

Calculated for $C_9H_{15}NO$: N, 9.14. Found: N, 9.03.

The product is a very weak base moderately soluble in water, very soluble in dilute mineral acids and unaffected by boiling twenty percent sodium hydroxide or sulfuric acid.

PREPARATION 3

Spiro[cyclohexane-1,2'-pyrrolidine]

A mixture of 95 grams (2.5 moles) of lithium aluminum hydride and 1.5 liters of tetrahydrofuran (distilled from lithium aluminum hydride) was refluxed with stirring for a few minutes and then a solution of 206 grams (1.343 moles) of spiro[cyclohexane-1,2'-pyrrolidone-5'] dissolved in 1.1 liters of tetrahydrofuran was slowly added. The stirred mixture was then heated at its refluxing temperature for eighteen hours. About two liters of solvent was removed by distillation and the following were slowly added to the residue in succession: one liter of U.S.P. ether, 200 milliliters of ethyl acetate, and one liter of concentrated hydrochloric acid dissolved in 1.5 liters of water. The strongly acidic solution was steam distilled until a distillation temperature of 100 degrees centigrade was reached. To the hot residue was added about 1,760 grams of aqueous fifty percent sodium hydroxide. The mixture was then steam distilled until practically no basic material came over with the distillate. The four liters of basic distillate was extracted twice with about one-liter portions of ether. The extracted aqueous layer was then subjected to continuous extraction with ether for six hours. The combined ether extracts were thoroughly dried with anhydrous potassium carbonate.

This procedure was followed on another run employing 83.5 grams of lithium aluminum hydride, 168.5 grams of spiro[cyclohexane-1,2'-pyrrolidone-5'] and two liters of tetrahydrofuran.

The combined runs were distilled through a twelve-inch column packed with ⅛-inch helices. After the solvent had been removed, the residue was distilled at reduced pressure. There was obtained a 286-gram fraction of spiro[cyclohexane-1,2'-pyrrolidine] distilling at 99 to 104 degrees centigrade at a pressure of 42 millimeters of mercury absolute and having an $n_D^{25}$ of 1.4817 and the analysis below.

Calculated for $C_9H_{17}N$: C, 77.63; H, 12.31; N, 10.06. Found: C, 77.95; H, 11.88; N, 9.24.

PREPARATION 4

β-Spiro[cyclohexane-1,2'-pyrrolidyl-1']-ethanol

A stirred mixture of 27.84 grams (0.2 mole) of spiro[cyclohexane-1,2'-pyrrolidine] and 16.1 grams (0.2 mole) of ethylene chlorohydrin in a 100-milliliter, round-bottomed flask fitted with a thermometer, reflux condenser and magnetic stirrer was rapidly heated to 120 degrees centigrade. The heat was removed as the mixture spontaneously rose to about 167 degrees centigrade. When the temperature had dropped to 120 degrees centigrade, the flask was again heated at 130 to 150 degrees centigrade for fifteen minutes. The cooled solution was mixed with thirty milliliters of aqueous fifty percent sodium hydroxide and then extracted thoroughly with four portions of ether. The combined ether extracts were dried with potassium carbonate, filtered and the ether removed by distillation. The residue was distilled through a six-inch column packed with ⅛-inch helices. After a fore-run of spiro[cyclohexane-1,2'-pyrrolidine] was removed, there was obtained 23.3 grams of β-spiro[cyclohexane-1,2'-pyrrolidyl-1']-ethanol distilling at 138 degrees centigrade at an absolute pressure of twelve millimeters of mercury. A sample taken from the center cut of the distillate had an $n_D^{25}$ of 1.5010 and the analysis below.

Calculated for $C_{11}H_{21}NO$: C, 72.08; H, 11.55; N, 7.64. Found: C, 72.41; H, 11.87; N, 7.66.

β-Spiro[cyclohexane-1,2′-pyrrolidyl-1′]-ethanol hydrochloride was prepared by adding an excess of anhydrous hydrogen chloride to a cooled solution of β-spiro[cyclohexane-1,2′-pyrrlidyl-1′]-ethanol in benzene. The precipitated, crystalline hydrochloride was filtered. A sample recrystallized from isopropyl alcohol gave spiro[cyclohexane-1,2′-pyrrolidyl-1′]-ethanol hydrochloride melting at 177.5 to 179 degrees centigrade and having the analysis below.

Calculated for $C_{11}H_{22}ClNO$: Cl, 16.13. Found: Cl, 16.30.

PREPARATION 5

γ-Spiro[cyclohexane-1,2′-pyrrolidyl-1′]-propanol

Following the procedure of Preparation 4, but employing 27.84 grams (0.2 mole) of spiro[cyclohexane-1,2′-pyrrolidine] and 18.9 grams (0.2 mole) of trimethylene chlorohydrin, there was thus obtained 23.43 grams of γ-spiro[cyclohexane-1,2′-pyrrolidyl-1′]-propanol distilling at 155 degrees centigrade at an absolute pressure of 11.5 millimeters of mercury, having an $n_D^{25}$ of 1.4979 and the analysis below.

Calculated for $C_{12}H_{23}NO$: N, 7.10. Found: N, 7.12.

PREPARATION 6

β-Spiro[cyclohexane-1,2′-pyrrolidyl-1′]-ethyl chloride hydrochloride

A cooled, rapidly stirred solution of 121 grams (0.676 mole) of β-spiro[cyclohexane-1,2′-pyrrolidyl-1′]-ethanol in 250 milliliters of benzene was saturated with anhydrous hydrogen chloride gas. Nitrogen was bubbled through the mixture to remove some of the excess hydrogen chloride and the flask then cooled to about zero degrees centigrade. To the cooled solution was slowly added sixty milliliters (0.88 mole) of thionyl chloride. The mixture became homogeneous. The solution was refluxed for two hours, with stirring, during which time the desired product precipitated. The precipitated crystals were filtered and washed with benzene and then with absolute ether to give 158 grams, a yield of 98 percent of the theoretical, of β-spiro[cyclohexane-1,2′-pyrrolidyl-1′]-ethyl chloride hydrochloride melting at 239 to 240 degrees centigrade and having the analysis below.

Calculated for $C_{11}H_{21}Cl_2N$: Cl, 29.77. Found: Cl, 29.50.

PREPARATION 7

γ-Spiro[cyclohexane-1,2′-pyrrolidyl-1′]-propyl chloride hydrochloride

Following the procedure described in Preparation 6, but employing 22.4 grams of γ-spiro[cyclohexane-1,2′-pyrrolidyl-1′]-propanol, fifty milliliters of benzene and fifteen milliliters of thionyl chloride, there was thus obtained 26.8 grams of γ-spiro[cyclohexane-1,2′-pyrrolidyl-1′]-propyl chloride hydrochloride melting at 224 to 227 degrees centigrade. A sample recrystallized from isopropyl alcohol melted at 225 to 227 degrees centigrade and had the analysis below.

Calculated for $C_{12}H_{23}Cl_2N$: Cl, 28.11. Found: Cl, 28.07.

EXAMPLE 1

α,α-Diphenyl-γ-(spiro[cyclohexane-1,2′-pyrrolidyl-1′])-butyronitrile and hydrochloride A vigorously stirred mixture of 38.6 grams of diphenylacetonitrile, 5.06 grams of lithium amide and 300 milliliters of dry toluene was refluxed in a nitrogen atmosphere for four hours. To this solution was added dropwise over a period of thirty minutes 0.22 mole of β-spiro[cyclohexane-1,2′-pyrrolidyl-1′]-ethyl chloride in dry toluene. The solution of the chloride was prepared by mixing 85.9 grams of the corresponding hydrochloride salt with toluene, ice and 35 milliliters of aqueous fifty percent sodium hydroxide, extracting thoroughly with toluene, drying the toluene and making up the solution to 400 milliliters with dry toluene. A 244.5 milliliter aliquot of this solution contained the required 0.22 mole of chloride.

The stirred mixture of the chloride and the lithium salt of diphenylacetonitrile was heated at its refluxing temperature for nineteen hours. The cooled mixture was washed with water which was then extracted with ether. The ether extracts and toluene layer were combined and shaken with a solution of forty milliliters of hydrochloric acid diluted to 300 milliliters with water. The resulting hydrochloride of α,α-diphenyl-γ-(spiro[cyclohexane-1,2′-pyrrolidyl-1′])-butyronitrile separated as a layer insoluble in water and the organic layer. The aqueous and hydrochloride layers were separated from the solvent layer, washed well with ether and then made basic with dilute sodium hydroxide. The oily free base separated and was extracted with ether and benzene. The combined ether and benzene solutions were washed with water, dried and the solvent distilled. The residue was distilled from a Claisen flask to give 46.3 grams of α,α-diphenyl-γ-(spiro[cyclohexane-1,2′-pyrrolidyl-1′])-butyronitrile as a viscous liquid, distilling at 160 degrees centigrade at an absolute pressure of 0.02 millimeter of mercury, which crystallized on standing. These crystals, when crystallized once from isopropyl alcohol, melted at 85 to ninety degrees centigrade and when crystallized again from the same solvent, melted at ninety to 92 degrees centigrade and had the analysis below.

Calculated for $C_{25}H_{30}N_2$: C, 83.75; H, 8.44; N, 7.82. Found: C, 83.95; H, 8.45; N, 7.80.

The moist toluene-ether layer from which the hydrochloride precipitated as an oil gradually deposited 5.56 grams of a dihydrate of α,α-diphenyl-γ-(spiro[cyclohexane-1,2′-pyrrolidyl-1′])-butyronitrile hydrochloride which, on slow heating in a capillary tube melted with foaming at 123 to 128 degrees centigrade, recrystallized and then remelted at 195 to 197 degrees centigrade and had an analysis correct for $C_{25}H_{31}ClN_2 \cdot 2H_2O$. A thoroughly dried sample had the analysis below.

Calculated for $C_{25}H_{31}ClN_2$: C, 76.01; H, 7.91. Found: C, 75.74; H, 8.04.

EXAMPLE 2

α,α-Diphenyl-γ-(spiro[cyclohexane-1,2′-pyrrolidyl-1′])-butyramide, hydrochloride and methobromide A solution of 32.8 grams of α,α-diphenyl-γ-(spiro[cyclohexane-1,2′-pyrrolidyl-1′])-butyronitrile and 55 milliliters of concentrated sulfuric acid in 5.5 milliliters of water was heated with stirring on a steam bath for four hours. The mixture was maintained at room temperature for eighteen hours and then poured onto ice. The gummy precipitate of the sulfate dissolved in the aqueous layer when ether was added. The aqueous layer was washed with ether and then made alkaline with ammonium hydroxide. The resulting oily precipitate soon crystallized and was filtered, washed with water and dried to give 36.2 grams of α,α-diphenyl-γ-(spiro[cyclohexane-1,2′-pyrrolidyl-1′])-butyramide melting at 164 to 168 degrees centigrade. Recrystallization from eighty percent ethanol raised the melting point to 169.5 to 172 degrees centigrade. The product had the analysis below.

Calculated for $C_{25}H_{32}N_2O$: C, 79.74; H, 8.57; N, 7.44. Found: C, 79.84; H, 8.32; N, 7.40.

A solution of 6.5 grams of α,α-diphenyl-γ-(spiro[cyclohexane-1,2′-pyrrolidyl-1′])-butyramide in methanol and 1.6 milliliters of concentrated aqueous hydrochloric acid was evaporated on a steam bath with a stream of nitrogen. Benzene was added to the residue which was also evaporated to a small volume. On cooling there was obtained 7.3 grams of α,α-diphenyl-γ-(spiro[cyclohexane- 1,2'-pyrrolidyl-1'])-butyramide hydrochloride melting at 214 to 215.5 degrees centigrade. A sample recrystallized from dimethylformamide had a melting point of 212.5 to 214.5 degrees centigrade and the analysis below.

Calculated for $C_{25}H_{33}ClN_2O$: C, 72.70; H, 8.05; Cl, 8.59. Found: C, 72.77; H, 8.12; Cl, 8.63.

A cold suspension of 7.53 grams of α,α-diphenyl-γ-(spiro[cyclohexane-1,2'-pyrrolidyl-1'])-butyramide in fifty milliliters of methanol was mixed with sixteen grams of cold methyl bromide. The mixture, in a tightly stoppered flask, was maintained at room temperature for four days, during which time the solution became homogeneous. The solvent was partially removed from the solution by distillation and ether was added to the concentrate, thus precipitating a gum. The gum was dissolved in methanol, the solution filtered, the methanol partially removed by distillation and the concentrate diluted with methyl ethyl ketone. The solution was boiled on a steam bath whereupon crystals of α,α-diphenyl-γ-(spiro[cyclohexane-1,2'-pyrrolidyl-1'])-butyramide methobromide precipitated which, when dried, weighed 8.84 grams, melted at 200 to 202 degrees centigrade, and had the analysis below.

Calculated for $C_{26}H_{35}BrN_2O$: C, 66.23; H, 7.48; Br, 16.95. Found: C, 66.14; H, 7.52; Br, 16.56.

EXAMPLE 3

α,α-Diphenyl - γ - (spiro[cyclohexane - 1,2' - pyrrolidyl-1']-N-methylbutyramide and hydrochloride A suspension of 8.28 grams (0.022 mole) of α,α-diphenyl - γ - (spiro[cyclohexane - 1,2' - pyrrolidyl-1'])-butyramide and 0.97 gram (0.025 mole) of sodium amide in 75 milliliters of dry toluene was heated at its refluxing temperature for two hours. The solution was cooled at about zero degrees centigrade and a solution of 2.3 grams (0.024 mole) of methyl bromide in 35 milliliters of cold toluene was added dropwise with stirring over a period of thirty minutes. The mixture was maintained at room temperature for about 22 hours and then extracted with dilute hydrochloric acid and the aqueous solution washed with ether. The washed aqueous solution was made basic with sodium hydroxide thereby precipitating the oily free base which was extracted with ether. The ether solution was washed with water, the ether distilled and the residue mixed with benzene which was also distilled to remove the water. The residual gum was dissolved in ether and the solution made slightly acidic with ethanolic hydrogen chloride. The hydrochloride precipitated as a gum which crystallized on standing. Recrystallization of these crystals from methyl ethyl ketone gave 5.95 grams of α,α - diphenyl - γ - (spiro[cyclohexane - 1,2' - pyrrolidyl-1'])-N-methylbutyramide hydrochloride melting at 186 to 188 degrees centigrade and having the analysis below. The infrared absorption spectrum was consistent with the structure.

Calculated for $C_{26}H_{35}ClN_2O$: C, 73.13; H, 8.26; Cl, 8.30. Found: C, 73.29; H, 7.96; Cl, 8.33.

EXAMPLE 4

α,α-Diphenyl - γ - (spiro[cyclohexane - 1,2' - pyrrolidyl-1']) - N,N - dimethylbutyramide, hydrobromide and methobromide A stirred mixture of 14.4 grams (0.06 mole) of diphenyl-N,N-dimethylacetamide [Gokhale et al., J. Univ. Bombay, 16, No. 5, 32–36 (1948); C.A., 43, 1144 (1949)], 2.65 grams (0.068 mole) of sodium amide and 100 milliliters of dry toluene was refluxed in a nitrogen atmosphere for two hours. After cooling, 72.2 milliliters of a solution of 0.065 mole of spiro[cyclohexane-1,2'-pyrrolidyl-1']-ethyl chloride in dry toluene (prepared as described above) was added in a dropwise fashion over a period of thirty minutes. The mixture was then maintained at its refluxing temperature for one hour and then at room temperature for about eighteen hours. The mixture was washed with water and the water then extracted with ether. The combined ether and toluene solutions were extracted with dilute hydrochloric acid which was then extracted with ether and finally made basic with sodium hydroxide. The free base separated as a gum which soon crystallized to give 23.7 grams of α,α-diphenyl - γ - (spiro[cyclohexane - 1,2' - pyrrolidyl - 1'])-N,N-dimethyl-butyramide melting, in its crude state, at 133 to 145 degrees centigrade; after one crystallization from isopropyl alcohol, at 147 to 152 degrees centigrade; and after a second crystallization from benzene, at 149 to 152 degrees centigrade and had the analysis below.

Calculated for $C_{27}H_{36}N_2O$: C, 80.15; H, 8.97; N, 6.93. Found: C, 80.44; H, 8.93; N, 6.87.

The filtrates from the above crystallizations were acidified with 48 percent hydrobromic acid and then concentrated by distillation of the solvent. Ether was added to the concentrate to give a gum which solidified on standing. The solid was crystallized first from a mixture of methyl ethyl ketone and acetone and then from methyl ethyl ketone to give white crystals of an acetone solvate of α,α - diphenyl - γ - (spiro[cyclohexane - 1,2' - pyrrolidyl-1')-N,N-dimethylbutyramide hydrobromide melting at about 103 to 110 degrees centigrade with decomposition. That this hydrobromide was obtained as a solvate with acetone was established by dissolving a 0.1 gram sample in ethanol containing 2,4-dinitrophenylhydrazine (Shriner and Fuson, "Identification of Organic Compounds," third edition, page 171) to obtain acetone 2,4-dinitrophenylhydrazone. The hydrobromide analyzed correctly for an equimolar solvate with acetone.

Calculated for $C_{27}H_{37}BrN_2O \cdot CH_3COCH_3$: C, 66.28; H, 7.97; Br, 14.70. Found: C, 66.48; H, 7.77; Br, 14.59.

To a cold suspension of 8.09 grams (0.02 mole) of α,α - diphenyl - γ - (spiro[cyclohexane - 1,2' - pyrrolidyl-1'])-N,N-dimethylbutyramide in 25 milliliters of acetone and forty milliliters of methanol was added ten grams of cold methyl bromide. The tightly stoppered flask was maintained at room temperature for three days. The resulting solution was concentrated by heating on a steam bath in an atmosphere of nitrogen to give an oil which crystallized on standing. The solid was triturated with absolute ether, filtered and dried to give white crystals which, when crystallized from methanol, gave 9.85 grams, a yield of 98 percent of the theoretical, of α,α-diphenyl-γ - (spiro[cyclohexane-1,2' - pyrrolidyl - 1']) - N,N - dimethylbutyramide methobromide melting at 191 to 193 degrees centigrade and having the analysis below.

Calculated for $C_{28}H_{39}BrN_2O$: C, 67.32; H, 7.87; Br, 16.00. Found: C, 67.12; H, 8.09; Br, 16.06.

EXAMPLE 5

α,α-Diphenyl - γ - (spiro[cyclohexane - 1,2' - pyrrolidyl-1'])-N,N-dimethylbutyramide hydrochloride Following the procedure of Example 3, but substituting α,α - diphenyl - γ - (spiro[cyclohexane - 1,2' - pyrrolidyl- 1']) - N - methylbutyramide for the α,α - diphenyl - γ - (spiro[cyclohexane - 1,2' - pyrrolidyl - 1'])-butyramide used therein, is productive of α,α-diphenyl-γ-(spiro[cyclohexane-1,2' - pyrrolidyl - 1']) - N,N - dimethylbutyramide hydrochloride.

By reacting the novel α,α-diaryl-ω-pyrrolidylalkanoamides or α,α-diaryl-ω-pyrrolidylalkanonitriles of this invention, preferably in the form of the free bases in an inert reaction medium with hydrogen peroxide, the amine oxides can be produced. Reacting these amine oxides with an acid in an inert reaction medium, e.g., hydrochloric, hydrobromic, hydriodic, sulfuric, phosphoric, acetic, propionic, benzoic, citric, succinic, lactic, nitric, or p-toluenesulfonic acid, is productive of the amine oxide acid addition salts.

It is to be understood that the invention is not to be limited to the exact details of operation or exact compounds shown and described, as obvious modifications

I claim:
1. A compound of the group consisting of (1) a compound of the following structural formula:

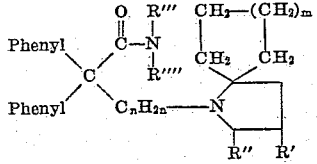

in which m is a whole number from one to two, inclusive, n is a whole number from two to six, inclusive, —C$_n$H$_{2n}$— is an alkylene group having from two to six carbon atoms, inclusive between the valences, R' and R" are each a member of the group consisting of hydrogen and the methyl radical, R'" and R"" taken singly are selected from the group consisting of hydrogen and a lower-alkyl radical of from one to eight carbon atoms, inclusive, and taken collectively are selected from the group consisting of an alkylene radical and an oxa-alkylene radical, said alkylene and oxa-alkylene radicals of from four to six carbon atoms, inclusive, and (2) pharmacologically acceptable lower-alkyl quaternary ammonium and acid addition salts thereof.

2. α,α - Diphenyl-γ-(spiro[cyclohexane-1,2'-pyrrolidyl-1'])-butyramide.
3. α,α - Diphenyl-γ-(spiro[cyclohexane-1,2'-pyrrolidyl-1'])-butyramide hydrochloride.
4. α,α - Diphenyl-γ-(spiro[cyclohexane-1,2'-pyrrolidyl-1'])-butyramide methobromide.
5. α,α - Diphenyl-γ-(spiro[cyclohexane-1,2'-pyrrolidyl-1'])-N-methylbutyramide.
6. α,α - Diphenyl-γ-(spiro[cyclohexane-1,2'-pyrrolidyl-1'])-N-methylbutyramide hydrochloride.
7. α,α - Diphenyl-γ-(spiro[cyclohexane-1,2'-pyrrolidyl-1'])-N,N-dimethylbutyramide.
8. α,α - Diphenyl-γ-(spiro[cyclohexane-1,2'-pyrrolidyl-1'])-N,N-dimethylbutyramide hydrobromide.
9. α,α - Diphenyl-γ-(spiro[cyclohexane-1,2'-pyrrolidyl-1'])-N,N-dimethylbutyramide methobromide.

10. The method comprising heating an α,α-disubstituted compound of the formula:

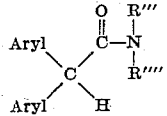

in which each Aryl is selected from the class consisting of phenyl and phenyl having substituents selected from the class consisting of phenyl, lower-alkyl, chlorine, bromine, iodine, nitro, hydroxy, and lower-alkoxy wherein R'" and R"" taken singly each represents a lower-alkyl radical of from one to eight carbon atoms, inclusive, and taken collectively are selected from the group consisting of an alkylene radical and an oxa-alkylene radical, said alkylene and oxa-alkylene radicals of from four to six carbon atoms, inclusive, with a compound of the formula:

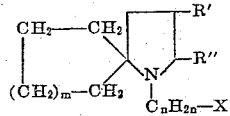

in which R' and R" are each a member of the group consisting of hydrogen and the methyl radical, X is a halogen atom, m is a whole number from one to two, inclusive, n is a whole number from two to six, inclusive, and —C$_n$H$_{2n}$— is an alkylene group having from two to six carbon atoms, inclusive, between the valences in an inert reaction medium in the presence of an alkaline condensing agent to produce an α,α-diaryl-ω-2-substituted-pyrrolidylalkyl compound of the formula:

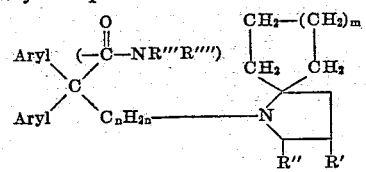

in which Aryl, R'", R"", R', R", m, n, and —C$_n$H$_{2n}$— are as defined above.

11. The method comprising heating an α,α-disubstituted compound of the formula:

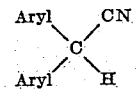

in which each Aryl is selected from the class consisting of phenyl and phenyl having substituents selected from the class consisting of phenyl, lower-alkyl, chlorine, bromine, iodine, nitro, hydroxy, and lower-alkoxy with a compound of the formula:

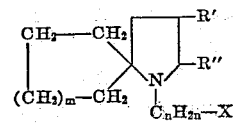

in which R' and R" are each a member of the group consisting of hydrogen and the methyl radical, X is a halogen atom, m is a whole number from one to two, inclusive, n is a whole number from two to six, inclusive, and —C$_n$H$_{2n}$— is an alkylene group having from two to six carbon atoms, inclusive, between the valences in an inert reaction medium in the presence of an alkaline condensing agent, to produce a compound of the formula:

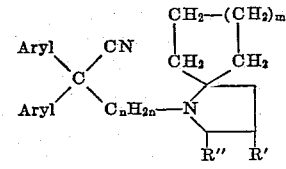

wherein Aryl, R', R", m, n, and —C$_n$H$_{2n}$— are as defined above, hydrolyzing the latter compound to transform the —CN radical to a

radical.

12. The method of claim 11 which includes the additional step of reacting the primary amido nitrogen atom with an alkyl halide to produce a compound of the formula:

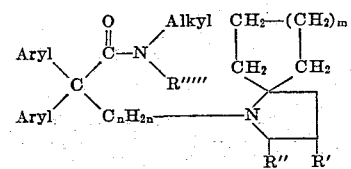

in which each Aryl is selected from the class consisting of phenyl and phenyl having substituents selected from the class consisting of phenyl, lower-alkyl, chlorine, bromine, iodine, nitro, hydroxy, and lower-alkoxy, Alkyl is a lower-alkyl radical of from one to eight carbon atoms, inclusive, R""" is a member of the group consisting of hydrogen and a lower-alkyl radical of from one to eight carbon atom, inclusive, R' and R" are each a member of the group consisting of hydrogen and the methyl radical, m is a whole number from one to two, inclusive, n is a whole number from two to six, inclusive, and —C$_n$H$_{2n}$— is an alkylene group having from two to six carbon atoms, inclusive, between the valences.

13. A compound of the group consisting of (1) a compound of the following structural formula:

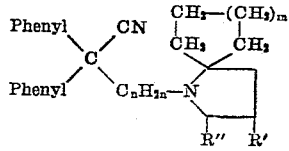

in which $m$ is a whole number from one to two, inclusive, $n$ is a whole number from two to six, inclusive, $-C_nH_{2n}-$ is an alkylene group having from two to six carbon atoms, inclusive, between the valences, R' and R" are each a member of the group consisting of hydrogen and the methyl radical, and (2) the pharmacologically acceptable lower-alkyl quaternary ammonium and acid addition salts thereof.

14. α,α - Diphenyl - γ - (spiro[cyclohexane - 1,2' - pyrrolidyl-1'])-butyronitrile.

15. α,α - Diphenyl - γ - (spiro[cyclohexane - 1,2' - pyrrolidyl-1'])-butyronitrile hydrochloride.

References Cited in the file of this patent
UNITED STATES PATENTS
2,814,622    Moffett  ---------------- Nov. 26, 1957